(12) United States Patent
Du et al.

(10) Patent No.: US 8,547,853 B2
(45) Date of Patent: Oct. 1, 2013

(54) ADAPTIVE PERIODIC POWER-SAVE (PS) POLLING

(75) Inventors: Shu Du, Richardson, TX (US); Ariton E. Xhafa, Plano, TX (US); Josef Peery, Ra'anana (IL); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 579 days.

(21) Appl. No.: 12/710,037

(22) Filed: Feb. 22, 2010

(65) Prior Publication Data

US 2010/0214942 A1 Aug. 26, 2010

Related U.S. Application Data

(60) Provisional application No. 61/155,383, filed on Feb. 25, 2009.

(51) Int. Cl.
*G01R 31/08* (2006.01)
(52) U.S. Cl.
USPC ............ 370/241; 370/338; 370/465
(58) Field of Classification Search
None
See application file for complete search history.

(56) References Cited

U.S. PATENT DOCUMENTS

| 8,014,305 | B1 * | 9/2011 | Gilbert et al. | 370/252 |
| 2005/0136913 | A1 * | 6/2005 | Kampen et al. | 455/426.2 |
| 2007/0147330 | A1 * | 6/2007 | Smith et al. | 370/346 |
| 2009/0310618 | A1 * | 12/2009 | Carter | 370/449 |

OTHER PUBLICATIONS

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, IEEE Std. 802.11, New York, NY, Jun. 12, 2007, pp. 425-436.
WiMax/WLAN & BT Coexistence, TI Mobile Connectivity Solutions, Texas Instruments Incorporated, 2005, 51 pages.

* cited by examiner

*Primary Examiner* — Kevin C Harper
(74) *Attorney, Agent, or Firm* — Steven A. Shaw; W. James Brady; Frederick J. Telecky, Jr.

(57) ABSTRACT

In accordance with at least some embodiments, a system includes an access point and a station in communication with the access point. The station selectively implements adaptive periodic Power-Save (APPS)-Polling logic for communications between the station and the access point. The APPS-Polling logic is configured to determine a timer value for periodic PS-Polling by monitoring a periodicity of arrival packets for at least a threshold amount of time.

16 Claims, 5 Drawing Sheets

ADAPTIVE PERIODIC POWER-SAVE (PS) POLLING

CROSS-REFERENCE TO RELATED APPLICATIONS

This application is a non-provisional application claiming priority to provisional application Ser. No. 61/155,383, filed on Feb. 25, 2009, entitled "Adaptively Find and Adjust the Periodic PSPoll Parameters in WLAN", the teachings of which are incorporated by reference herein.

BACKGROUND

Next generation mobile devices implement a plurality of wireless technologies to support voice communications and data communications. In particular, high-speed data technologies such as GPRS, EDGE, and IEEE 802.11a/b/g/n WLAN technology facilitate data communications. WLAN technology is a power hungry technology; hence battery power limitations remain a constraint and techniques to improve battery power and/or power efficiency are being pursued. Often power-saving mechanisms are an important differentiating factor between different handset vendors.

The IEEE 802.11 standard specifies a Power-Save (PS) mechanism for use by WLAN stations. This mechanism is shown in FIG. 1 and operates as follows:

The WLAN node informs the access point (AP) that the node is entering a Power-Save (PS) mode during which the AP is able to buffer packets that are addressed for this node.

The AP periodically sends beacons which include a traffic indication map (TIM) informing the nodes that are in PS mode whether there are buffered packets for these nodes or not.

If a node learns from the TIM that the AP has buffered packets for it, the node transmits a Power-Save Polling (PS-Poll) frame after a time interval. The duration of the time interval depends on the number of active-mode stations (STAs) present in the network, as well as the number of PS-mode STAs informed via the TIM because transmission of PS-Poll frame from the node competes with other transmissions from other nodes and follows WLAN CSMA/CA (Carrier Sense Multiple Access with Collision Avoidance) procedure Once the AP receives the PS-Poll, the AP responds with an acknowledgment (ACK) and thereafter sends a buffered data packet to the corresponding STA. The AP can also send a buffered data packet directly to the STA immediately after receiving a PS-Poll (without sending an ACK first). In either case, the "more data bit indicator" of the sent data packet header could be set to "1" if there are more buffered packets for this node, or "0" if there are no more packets left in the buffer for this node. The node/STA will transmit another PS-Poll if more data bit is set to "1" and the process continues.

The above PS-Poll approach is able to save STAs significant power as they can turn off their radios from time to time without losing their data service. However, this PS-Poll approach also suffers from longer delays for the downlink data, which may potentially be a performance pitfall for Quality of Service (QoS) applications, such as Voice over IP (VoIP) or real-time audio/video broadcasting, because these applications usually demand stringent delay bounds for their data packet delivery. For example, a typical VoIP traffic flow demands to have a 30 ms delay bound for its packet. If a WLAN beacon interval is set at a typical value of 100 ms, it is quite likely that the buffered VoIP packet at the AP will experience a delay bound beyond 30 msec.

In order to satisfy the delay bound requirements of QoS flows, a periodic PS-Poll mechanism has been proposed and implemented. Using this mechanism, a PS mode station may periodically send out a PS-Poll to the AP node asking for buffered data packets even if the station did not receive an indication from the AP that it has the buffered data. The operation of periodic PS-Polling is illustrated in FIG. 2.

As shown in FIG. 2, the STA sends periodic PS-Poll for every interval time of $T_i$. If the AP does not have buffered data for the STA, the STA is idle after receiving the PS-ACK from the AP. In many AP implementations, if the AP does not have data to send to the STA, instead of doing nothing, the AP will send a QoS-NULL packet to tell the station about its current buffer status. In either case, after a timeout of $T_o$, it is reasonable to let the STA go to sleep mode if the STA does not receive anything during that time. If on the other hand, the AP has buffered data for the STA, then the AP will send a single data packet (from the buffered data) to the STA. If the AP has more than one buffered data packet, the data packet will have a "more data bit indication" set so that the STA will continue to poll for the next buffered data packet. Although the above-mentioned periodic PS-Poll mechanism can help STAs in WLAN to partially solve the delay bound problem due to QoS flow, improvements to periodic PS-polling are possible.

SUMMARY

In accordance with at least some embodiments, a system includes an access point and a station in communication with the access point. The station selectively implements adaptive periodic Power-Save (APPS)-Polling logic for communications between the station and the access point. The APPS-Polling logic is configured to determine a timer value for periodic PS-Polling by monitoring a periodicity of arrival packets for at least a threshold amount of time.

In at least some embodiments, a communication device includes a transceiver with at least one wireless technology subsystem. To maintain a Quality of Service (QoS) flow while conserving power for the communication device, the transceiver includes logic that selectively determines a timer value for periodic Power-Save (PS)-Polling by monitoring a periodicity of arrival packets for at least a threshold amount of time.

In at least some embodiments, a method for a communication device includes determining if a packet arrival interval is provided by an access point. If the packet arrival interval is provided, the method includes determining a timer value for periodic Power-Save (PS)-Polling based on the packet arrival interval. If the packet arrival interval is not provided, the method includes determining a timer value for periodic PS-Polling by monitoring a periodicity of arrival packets for at least a threshold amount of time.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
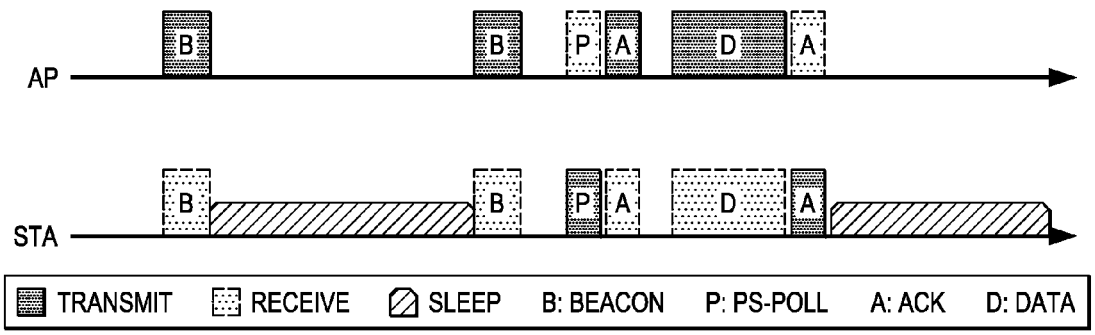
FIG. 1 shows a prior art power-save (PS) mechanism in WLAN.
Figure 2:
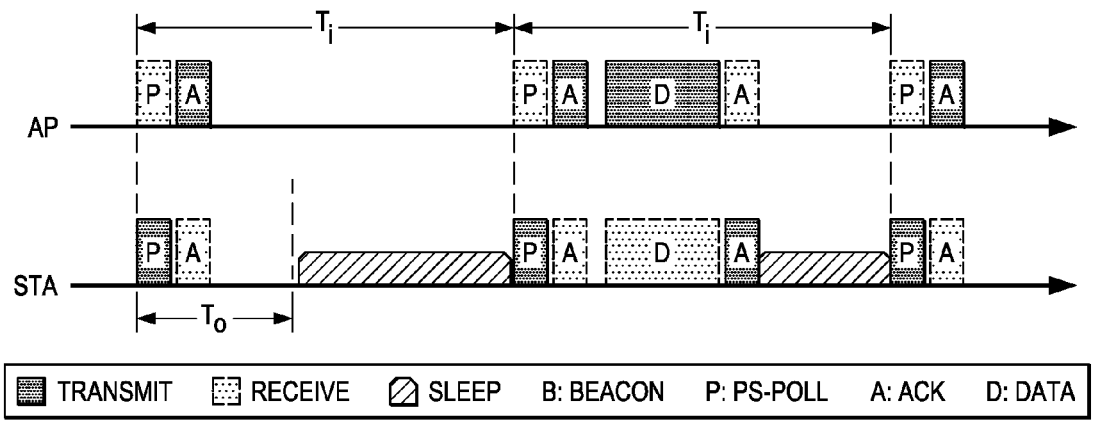
FIG. 2 shows a prior art periodic PS-Poll mechanism in WLAN.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure are directed to methods for an improved periodic PS-Poll mechanism referred to herein as adaptive periodic PS-Polling (APPS-Polling). Embodiments of the disclosure are also directed to devices/systems that implement APPS-Polling. As described herein, APPS-Polling determines how to setup the value of the periodic timer value ($T_i$) and the PS-Poll timeout timer value ($T_o$). Further, APPS-Polling determines when to send the first periodic PS-Poll (once $T_i$ and $T_o$ are known). Further, APPS-Polling handles issues related to multiple QoS flows existing for a station (STA). Further, APPS-Polling handles issues related to wireless technology co-existence scenarios, where conflicting wireless technologies (e.g., WLAN and Bluetooth) use time-multiplexing to share the communication medium. In at least some embodiments, APPS-Polling is implemented by STAs of a WLAN network to satisfy QoS flow requirements while conserving power for the STAs. The APPS-Polling techniques described herein may be repeated over time to ensure appropriate values for $T_i$, $T_o$, and the start time are maintained over time.

In order to manage periodic PS-Polling, the interval of the periodic PS-Poll needs to be determined. As PS-Polls are sent out more frequently, the likelihood of there being no data packets in response to these PS-Polls increases. In other words, sending out PS-Polls too frequently results in wasting communication medium resources as well as station (STA) power to transmit these PS-Polls. On the other hand, if PS-Polls are sent out too infrequently, the data packets buffered at the AP will experience long delays and could be dropped due to delay bound requirements.

In accordance with at least some embodiments, a station application or the AP indicates values of $T_i$ and $T_o$ to the MAC layer of a STA. In the IEEE 802.11e standard, for every flow, there is a traffic profile stored at the station and/or the AP in order to assign the current access category of these flows. If the traffic profile describes the packet arrival interval and the delay bound of the flow, the APPS-Polling mechanism may simply use the packet arrival interval as the value of $T_i$ and use the delay bound as the value of $T_o$. In some cases, the delay bound value is actually very large, even larger than the packet arrival interval value. For these cases, $T_i$ may be set to be a multiple of the packet arrival interval. In this manner, even if a station does not wake up for every packet arrival, a packet can still be received within the delay bound (although this may increase the requirement on AP's buffer size). The tradeoff is that the station can spend more time sleeping and thus save more power.

Figure 3:
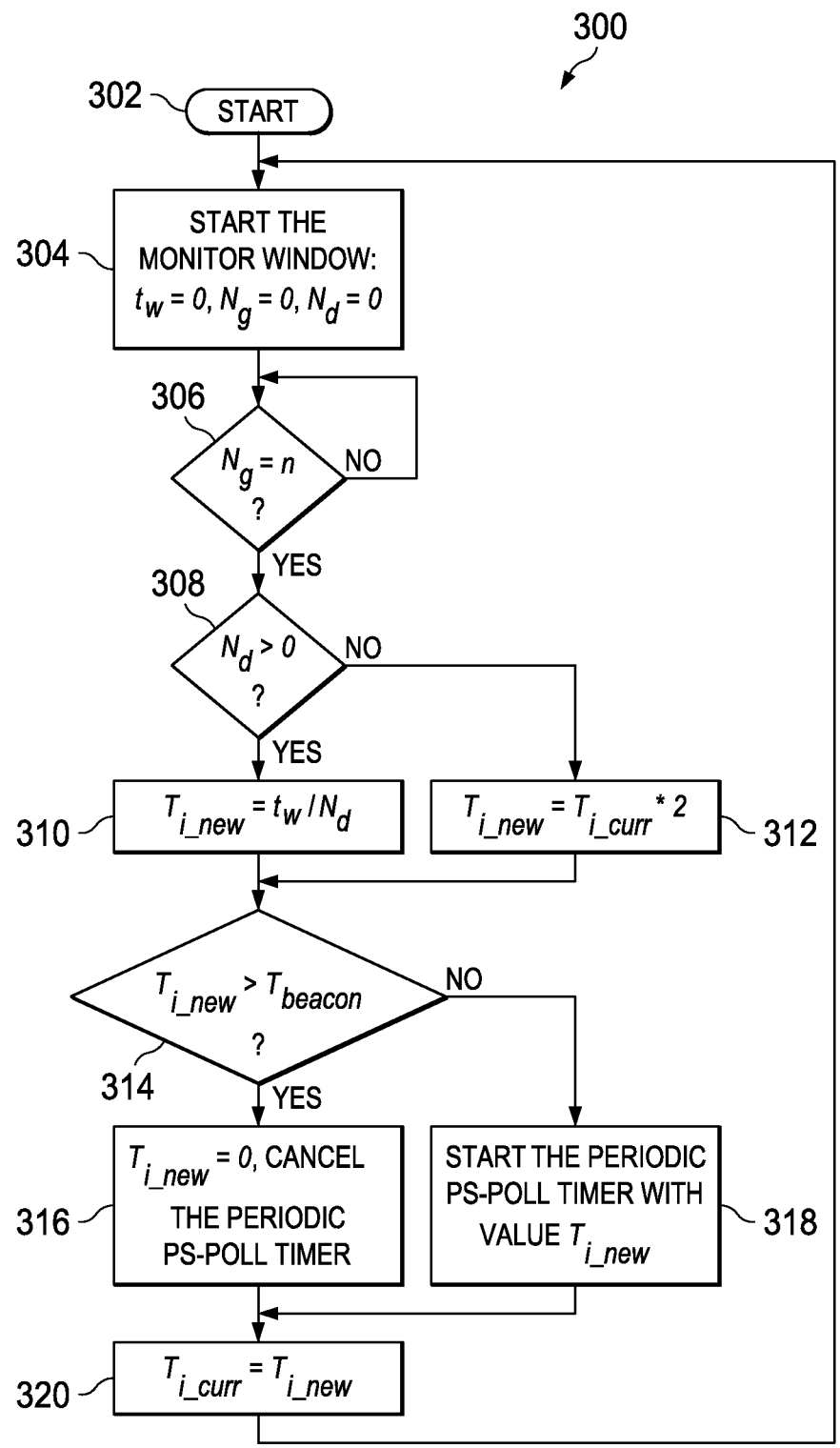
FIG. 3 shows a method illustrative of an algorithm for selecting a periodic PS-Poll period ($T_i$) in accordance with an embodiment of the disclosure.

If the traffic profile of the current flow does not provide detailed information regarding the packet arrival interval and the delay bound of the flow, the station can learn the periodicity of packet arrival based on the history of packet arrival. FIG. 3 shows a method 300 illustrative of an algorithm for selecting a periodic PS-Poll period ($T_i$) in accordance with an embodiment of the disclosure. The method 300 is performed by a station. In accordance with at least some embodiments, a station originally follows the IEEE 802.11 standard by sending out a PS-Poll frame when the TIM in a beacon from the AP indicates that the AP has buffered packets for the station. As specified in the IEEE 802.11 standard, after a PS-Poll is sent, if the received data packet has the "more data bit" set to 1, another PS-Poll will be sent out at the first opportunity that the STA has to send the PS-Poll. The process will continue until the "more data bit" in the data packet is set to 0. As used herein, PS-Polls that are sent out until the "more data bit" is set to 0 are referred to as a "PS-Poll group". The first PS-Poll in a PS-Poll group is triggered by a beacon or a periodic PS-Poll timer, while the other PS-Polls in the PS-Poll group are triggered by the "more data bit" being set to 1 in each received data packet. The data packets that are sent in response to a PS-Poll group may belong to the same flow or different flows. However, in the algorithm of method 300, all data packets sent in response to the same PS-Poll group are assumed to belong to the same traffic flow. The number of data packets received in response to the same PS-Poll group could vary from zero to many data packets.

As shown, the method 300 starts at block 302 and continues to block 304, where a monitor window timer ($t_w$) is started to count the number of PS-Poll groups ($N_g$) and the total number of data packets ($N_d$) received during the monitor window. When $N_g$ equals a predefined number n (determination block 306), $t_w$ is stopped and the duration of the past monitor window is recorded. If, during the monitor window, the total number of packets received is greater than zero, i.e., $N_d>0$ (determination block 308), a new periodic PS-Poll interval value is set to $T_{i\_new}=t_w/N_d$ (block 310). If, during the monitor window, the total number of packets received is zero, i.e., $N_d=0$ (determination block 308) and the current periodic PS-Poll interval value $T_{i\_current}$ is non-zero, then the new periodic PS-Poll interval value is set to $T_{i\_new}=T_{i\_current}*2$ (block 312). If $T_{i\_new}$ is larger than the current beacon period interval (determination block 314), then there is no need to start the periodic PS-Poll timer and the PS-Poll interval value is set to zero (block 318). Otherwise, the periodic PS-Poll timer (T) is started with the value $T_{i\_new}$ (block 318). When the timer expires, the station sends a periodic PS-Poll and restarts the timer. At block 320, $T_{i\_new}$ is assigned to $T_{i\_current}$ and the method 300 returns to block 304.

In the method 300, the past history (within the past n PS-Poll groups) is used to predict the periodicity of arrival packets. The predefined number n should be large enough to prevent any random variation. Also, in case the determined periodicity interval is larger than the beacon interval, the station performing the method 300 does not need an extra periodic PS-Poll timer to start to send PS-Polls since the station needs to wake up and receive the AP beacon anyway.

Although $T_0$ cannot be predicted directly from the method 300, $T_0$ can be indirectly determined based on the value of $T_i$ and the received packet size, since typical QoS applications will have fixed packet arrival intervals and packet sizes. Therefore, the type of application can be predicted (or this information is conveyed by the upper layers in the device) and its delay bound can be derived also. In some cases, the data packets may arrive at the AP at uneven time intervals (in a bursty manner). For example, for every d seconds, m packets for the STA may arrive at the AP. When this happens, the method 300 may suggest the STA set up the periodic PS-Poll timer $T_i$=m/d seconds. However, the STA may then discover that among the many periodic PS-Polls sent out, only one periodic PS-Poll packet receives multiple data packets in response and other PS-Polls may receive no response or only QoS-NULL packets. If this situation occurs for several monitor windows, the STA may conclude that the data packets arrive in a burst. Therefore, the STA cancels unnecessary periodic PS-Polls by increasing $T_i$ by $T_i=T_i*(x+y)/x$, where x is the number of PS-Polls that receive data packets, and y is the number of PS-Polls that receive no data packets or that only receive QoS-NULL packets.

Figure 4:
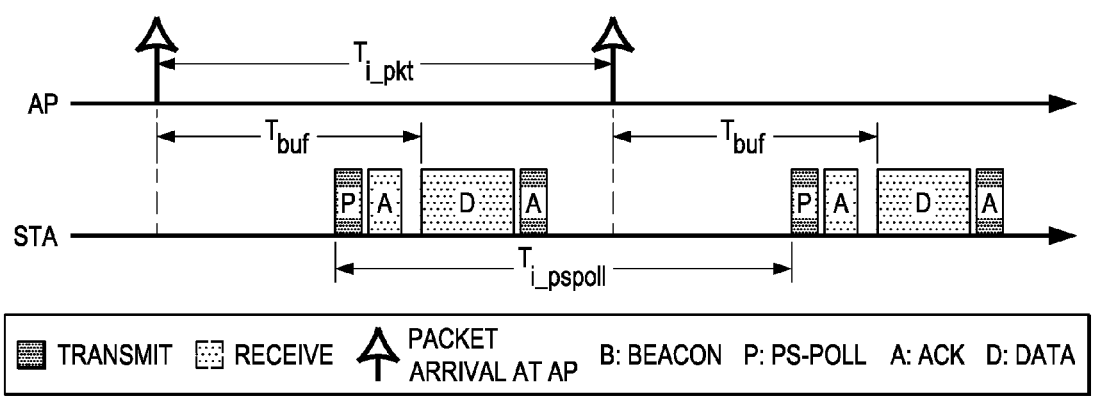
FIG. 4 shows use of an offset with a periodic PS-Poll mechanism in accordance with an embodiment of the disclosure.

Even if the periodicity of the arrival packets is estimated, the station still needs to determine when to trigger the periodic timer so as to decrease the buffer time of the data packets in the AP. FIG. 4 shows use of an offset with a periodic PS-Poll mechanism in accordance with an embodiment of the disclosure. As shown in FIG. 4, the periodic PS-Poll interval value $T_{i\_pspoll}$ has the same value as the AP packet arrival interval $T_{i\_pkt}$. However, the station does not send out the PS-Poll once the packet arrives at the AP. This causes the AP to buffer the arriving data packet for the duration of $T_{buf}$. If $T_{buf}$ is too long, QoS packets may be discarded due to delay bound requirements. Lengthy buffering durations also waste AP resources.

Figure 5:
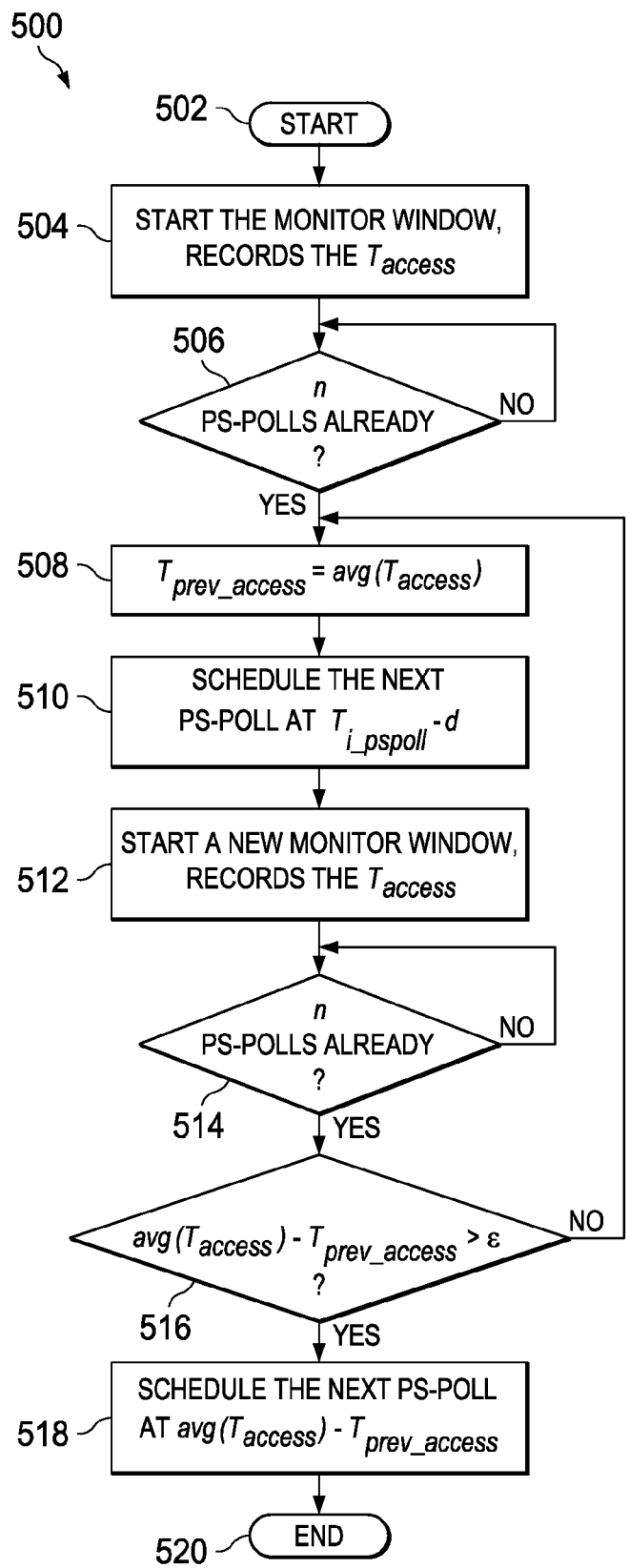
FIG. 5 shows a method illustrative of an algorithm for selecting a periodic PS-Poll start time in accordance with an embodiment of the disclosure.

In at least some embodiments, APPS-Polling implements an algorithm that automatically adjusts the starting time of the periodic PS-Poll so that the AP buffering time ($T_{buf}$) is as small as possible. This algorithm is based on the assumption that the periodic PS-Poll interval value ($T_{i\_pspoll}$) has already been chosen and is the same as that of the packet arrival interval ($T_{i\_pkt}$). FIG. 5 shows a method 500 illustrative of the algorithm for selecting a periodic PS-Poll start time (offset) in accordance with an embodiment of the disclosure. As shown, the method 500 starts at block 502 and continues to block 504, where a time window that monitors n periodic PS-Polls is started (n is a predetermined value). The predetermined number n should be large enough to prevent any random variations. During the time window, an access time duration ($T_{access}$) is recorded as the value between the time a PS-Poll ACK is received and the time when the buffered data starts to arrive. If the AP has buffered data for the station when the periodic PS-Poll is received, $T_{access}$ corresponds to the time for the AP to dequeue the data and to compete for the medium access for the data. After the time window is completed by detection of n PS-Polls (determination block 506), the recorded average value of $T_{access}$ during the window is saved as $T_{prev\_access}$ (block 508). Instead of scheduling the next periodic PS-Poll after $T_{i\_pspoll}$, the next periodic PS-Poll is scheduled at $T_{i\_pspoll}-d$, where d is a small time interval such as 5 ms (block 510). Note that even though the next PS-Poll trigger time is shifted, the periodic PS-Poll interval value remains the same, $T_{i\_pspoll}$. At block 512, another time window is started to record $T_{access}$. Upon completion of the time window by detection of n PS-Polls (determination block 514), the average value of $T_{access}$ is compared with $T_{prev\_access}$, and if they are approximately the same (determination block 516), the method 500 returns to block 508. In determination block 516, the difference of the average value of $T_{access}$ and $T_{prev\_access}$ is compared with $\epsilon$, which is a predetermined small value such as 0.1 ms. If the new average value of $T_{access}$ is much larger than $T_{prev\_access}$ (larger than the value $\epsilon$ as in the determination block 516), then the next periodic PS-Poll is scheduled at average ($T_{access}$)-$T_{prev\_access}$ (block 518). The method 500 ends at block 520. Note that the periodic PS-Poll interval value ($T_{i\_pspoll}$) may remain the same even if the start time for periodic PS-Polling changes.

The method 500 is based on the observation that once the data packet is in the queue, the AP will probably take $T_{access}$ amount of time to start delivering the data packet to the station. Therefore, if the PS-Poll starting time is shifted towards the packet arrival time, $T_{access}$ will not vary by much unless the PS-Poll starting time has been shifted too much so that when the PS-Poll is received (by the AP), the data has not been received by the AP yet. When this happens, the difference between the current average $T_{access}$ and the old $T_{prev\_access}$ yields the extra waiting time duration for the data packet arrival in the AP buffer. In some embodiments, if an AP does not have buffered data for the stations that they receive PS-Polls from, the AP will send QoS-NULL packets to the stations. In such case, block 516 shall be bypassed, and block 518 is changed so that if the station receives a QoS-NULL packet instead of the expected data packets, the station schedules the next periodic PS-Poll as $T_{prev\_access}+d$. In other words, the station will fall back to the previous offset. If further optimization is desired, the station can try a smaller value of d and re-do the method 500.

The methods 300 and 500 described previously are for single QoS flow. To extend the methods 300 and 500 to multiple QoS flows, two issues are addressed for APPS-Polling embodiments. First, stations need to distinguish data packets that are destined for different flows. Such distinguishing may be accomplished by analyzing the packet size, the source or destination addresses (e.g., in the IP layer), and/or the source or destination port numbers (e.g., in the transport layer). In some embodiments, the traffic profile may indicate the flow ID. After a station successfully detects that packets are from different flows, the station runs methods 300 and 500 for each flow separately. Also, there should be a separate periodic PS-Poll timer for each flow. The periodic PS-Polls are enqueued for transmission based on the independent decision of the different periodic PS-Poll timers. However, before a new PS-Poll is enqueued, a determination is made regarding whether or not there is already another PS-Poll in the queue waiting to be sent out. In such case, the new PS-Poll is discarded, since only one PS-Poll needs to be sent at a given time. If the AP has many buffered data packets for different flows, the "more data bit" is still going to be set in data packets and the station will send new PS-Polls based on such bits.

To summarize, APPS-Polling enables WLAN stations in Power-Save mode to receive their QoS data on time. There are many open issues on how to choose the periodicity of periodic PS-Polling and when to start periodic PS-Polling. For at least some APPS-Polling embodiments, an algorithm (method 300) is implemented to determine the periodicity of the packet arrival rate automatically, so that the periodic PS-Poll interval can be set to an appropriate interval value. Another algorithm (method 500) is implemented to automatically adjust the offset time of periodic PS-Polling so that QoS data buffering times at the AP are as short as possible. APPS-Polling embodiments may also address issues related to there being multiple flows and/or issues related to Bluetooth (BT) (or other wireless technologies) and WLAN technologies that are operating on the same mobile device (STA).

Figure 6:
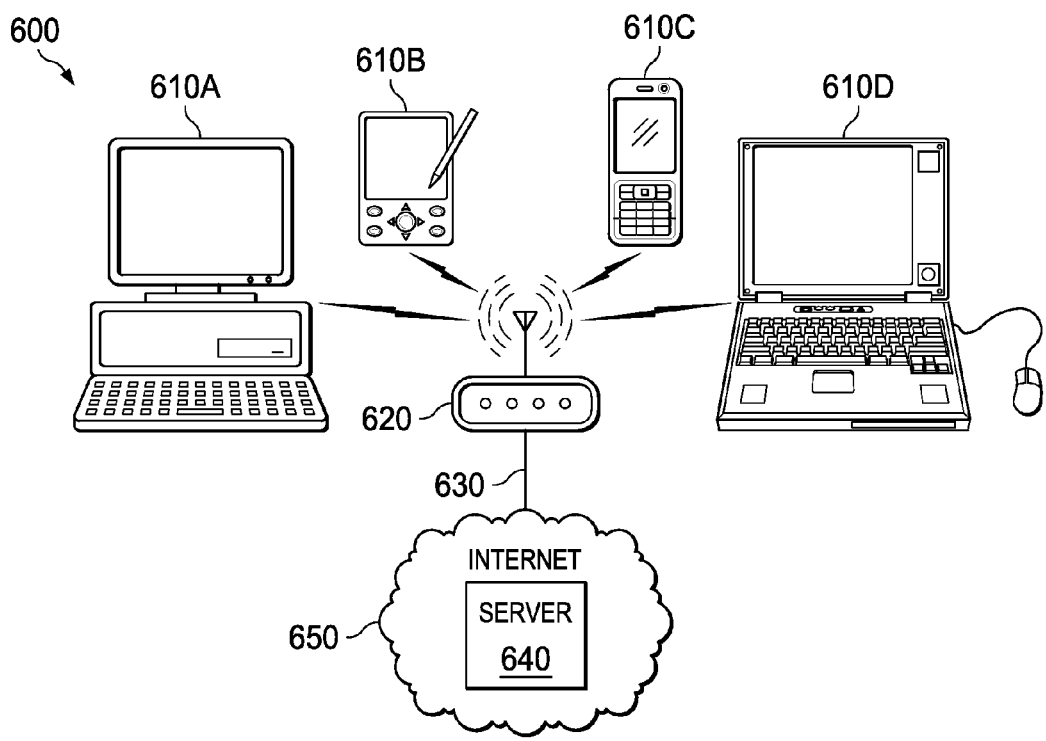
FIG. 6 illustrates a wireless local area network (WLAN) in accordance with an embodiment of the disclosure.

FIG. 6 illustrates a wireless local area network (WLAN) 600 in accordance with an embodiment of the disclosure. To provide wireless data and/or communication services (e.g., telephone services, Internet services, data services, messaging services, instant messaging services, electronic mail (email) services, chat services, video services, audio services, gaming services, etc.), the WLAN 600 comprises an access point (AP) 620 and any of a variety of fixed-location and/or mobile wireless devices or stations (STAs) (referred to individually herein as device, station, STA or device/station), four of which are respectively designated in FIG. 6 with reference numerals 610A, 610B, 610C and 610D. It should be appreciated that the network 600 is meant to be illustrative and not exhaustive. For example, it should be appreciated that more, different or fewer communication systems, devices and/or paths may be used to implement embodiments. Exemplary devices 610 include any variety of personal computer (PC) 610A with wireless communication capabilities, a personal digital assistant (PDA) or MP3 player 610B, a wireless telephone 610C (e.g., a cellular phone, a smart phone, etc.), and a laptop computer 610D with wireless communication capabilities. At least one of AP 620 and STAs 610A-610D are preferably implemented in accordance with at least one wired and/or wireless communication standard (e.g., from the IEEE 802.11 family of standards). Further, at least one device 610 comprises a combo device with a plurality of wireless network technology subsystems onboard.

In the example of FIG. 6, to enable the plurality of devices/STAs 610A-610D to communicate with devices and/or servers located outside WLAN 600, AP 620 is communicatively coupled via any of a variety of communication paths 630 to, for example, any of a variety of servers 640 associated with public and/or private network(s) such as the Internet 650. Server 640 may be used to provide, receive and/or deliver services such as data, video, audio, telephone, gaming, Internet, messaging, electronic mail, or other services. Additionally or alternatively, WLAN 600 may be communicatively coupled to any of a variety of public, private and/or enterprise communication network(s), computer(s), workstation(s) and/or server(s) to provide any of a variety of voice service(s), data service(s) and/or communication service(s).

In accordance with at least some embodiments, at least one of the STAs 610A-610D is a device that implements the disclosed APPS-Polling techniques described herein. Such a device is referred to as an "APPS-Poll STA". An APPS-Poll STA implements APPS-Polling logic to handle communications between the APPS-Poll STA and the access point 620. More specifically, APPS-Polling logic is configured to determine a timer value for periodic PS-Polling by monitoring a periodicity of arrival packets for at least a threshold amount of time. The threshold amount of time is large enough to prevent random variations in the periodicity of arrival packets. If the timer value is greater than a beacon interval, the APPS-Polling logic does not implement the timer value for periodic PS-Polling. Further, if a traffic profile provided by the access point indicates a packet arrival interval, the APPS-Polling logic uses the provided packet arrival interval as the timer value and foregoes the monitoring operation.

In accordance with at least some embodiments, a timeout timer value for PS-Polling is selected. For example, the APPS-Polling logic of an APPS-Poll STA may determine a timeout value for PS-Polling based on a previously determined periodic PS-Polling interval timer value and a received packet size. Alternatively, if a traffic profile provided by the AP indicates a delay bound for the AP, the APPS-Polling logic of an APPS-Poll STA may use the provided delay bound as the timeout timer value for PS-Polling.

Further, in at least some embodiments, the APPS-Polling logic of an APPS-Poll STA may determine a start time for sending periodic PS-Polls based on an access time duration estimated as a time period between when a PS-Poll ACK is received and when buffered data related to the ACK arrives. If desired, the start time may be further adjusted using an adjustable time interval (i.e., the start time is based on the estimated access time duration minus an adjustable time interval).

In accordance with at least some embodiments, the APPS-Polling logic of an APPS-Poll STA adjusts the periodic PS-Polling interval timer value and a start time for the periodic PS-Polling interval timer value over time. Such adjustments may be determined by repeating the methods 300 and 500 described herein over time. Further, the APPS-Polling logic of an APPS-Poll STA may be configured to identify multiple flows and to determine a separate timer value and start time for periodic PS-Polling for each flow.

Figure 7:
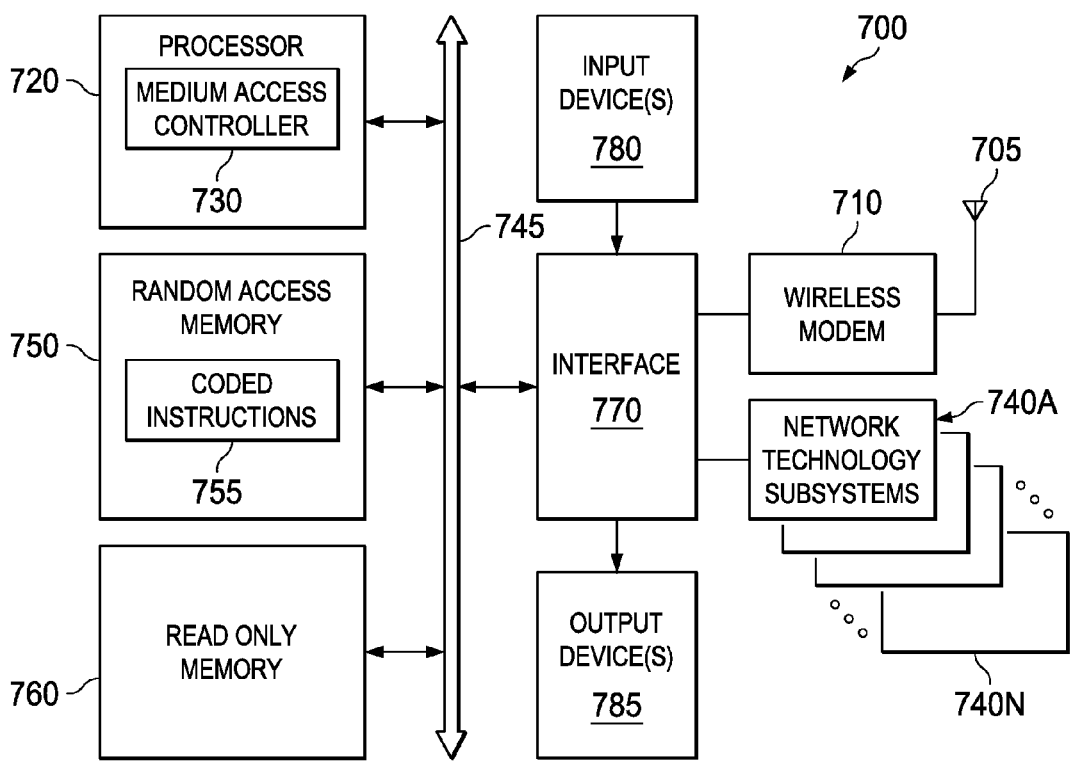
FIG. 7 illustrates an exemplary access point and/or wireless device in accordance with an embodiment of the disclosure.

The APPS-Polling techniques described herein may be implemented on any general-purpose computer with sufficient processing power, memory resources, and network throughput capability to handle the necessary workload placed upon it. FIG. 7 illustrates an exemplary access point and/or wireless device in accordance with an embodiment of the disclosure. In FIG. 7, the device 700 may be, for example, an access point or other wireless device. It should be expressly understood that any device on, for example, WLAN 600 or other embodiments, may at times be an access point and at other times be a station. It should also be understood that in some embodiments, there may be at least one dedicated access point, with any number of devices acting as stations.

As shown, the device 700 comprises at least one of any of a variety of radio frequency (RF) antennas 705 and any of a variety of wireless modems 710 that support wireless signals, wireless protocols and/or wireless communications (e.g., according to IEEE 802.11n). RF antenna 705 and wireless modem 710 are able to receive, demodulate and decode WLAN signals transmitted in a wireless network. Likewise, wireless modem 710 and RF antenna 705 are able to encode, modulate and transmit wireless signals from device 700 to other devices of a wireless network. Thus, RF antenna 705 and wireless modem 710 collectively implement the "physical layer" (PHY) for device 700. It should be appreciated that device 700 is communicatively coupled to at least one other device and/or network (e.g., a local area network (LAN), the Internet 650, or other devices). It should further be understood that illustrated antenna 705 may represent one or more antennas, while the illustrated wireless modem 710 may represent one or more wireless modems.

The device 700 further comprises processor(s) 720. It should be appreciated that processor 720 may be at least one of a variety of processors such as, for example, a microprocessor, a microcontroller, a central processor unit (CPU), a main processing unit (MPU), a digital signal processor (DSP), an advanced reduced instruction set computing (RISC) machine, an (ARM) processor, etc. Processor 720 executes coded instructions 755 which may be present in a main memory of the processor 720 (e.g., within a random-access memory (RAM) 750) and/or within an on-board memory of the processor 720. Processor 720 communicates with memory (including RAM 750 and read-only memory (ROM) 760) via bus 745. RAM 750 may be implemented by dynamic RAM (DRAM), synchronous dynamic RAM (SDRAM), and/or any other type of RAM device. ROM 760 may be implemented by flash memory and/or any other type of memory device.

Processor 720 implements MAC 730 to provide medium access controller (MAC) functionality. In accordance with at least some embodiments, the MAC 730 implements the APPS-Polling techniques described herein. The MAC 730 is implemented by executing one or more of a variety of software, firmware, processing thread(s) and/or subroutine(s) with the example processor 720. Further, the MAC 730 may be, additionally or alternatively, implemented by hardware, software, firmware or a combination thereof, including using an application specific integrated circuit (ASIC), a programmable logic device (PLD), a field programmable logic device (FPLD), discrete logic, etc.

The device 700 also preferably comprises at least one input device 780 (e.g., keyboard, touchpad, buttons, keypad, switches, dials, mouse, track-ball, voice recognizer, card reader, paper tape reader, etc.) and at least one output device 785 (e.g., liquid crystal display (LCD), printer, video monitor, touch screen display, a light-emitting diode (LED), etc.)—each of which are communicatively connected to interface 770.

As shown, interface 770 also communicatively couples the wireless modem 710 with the processor 720 and/or the MAC 730. Interface 770 provides an interface to, for example and not by way of limitation, Ethernet cards, universal serial bus (USB), token ring cards, fiber distributed data interface (FDDI) cards, network interface cards, wireless local area network (WLAN) cards, or other devices that enable device 700 to communicate with other devices and/or to communicate via Internet 650 or intranet. With such a network connection, it is contemplated that processor(s) 720 would be able to receive information from at least one type of network technology and/or output information to at least one type of network technology in the course of performing the herein-described processes. It should be appreciated that interface 770 may implement at least one of a variety of interfaces, such as an external memory interface or a serial port for communications internal to device 700 (general purpose input/output (I/O) interfaces).

As shown in FIG. 7, the device 700 comprises network technology subsystems $740_A$-$740_N$, where N is the number network technology subsystems in device 700. In accordance with embodiments, device 700 comprises at least two dissimilar network technology subsystems 740. As a result, device 700 is said to have coexisting network technologies.

"Dissimilar" is used in this context to mean that at least one of the subsystems $740_A$-$740_N$ is from a different network technology than another one of the subsystems $740_A$-$740_N$. It should be understood that some of the subsystems $740_A$-$740_N$ may have their own dedicated wireless modem and antenna, while other subsystems $740_A$-$740_N$ may share either or both of a wireless modem and antenna. Examples of network technologies that may be represented by such subsystems $740_A$-$740_N$ include, but are not limited to, worldwide interoperability for microwave access (WiMAX) networks, wireless local area network (WLAN) networks, long term evolution (LTE) mobile telephony networks, personal area networks (PANs), wireless universal serial bus (USB) networks, BLUETOOTH (BT) networks, ZigBee/IEEE 801.15.4, etc. In accordance with embodiments, processor 720 interacts with network technology subsystems subsystems $740_A$-$740_N$ via interfaces implemented by interface 770.

Figure 8:
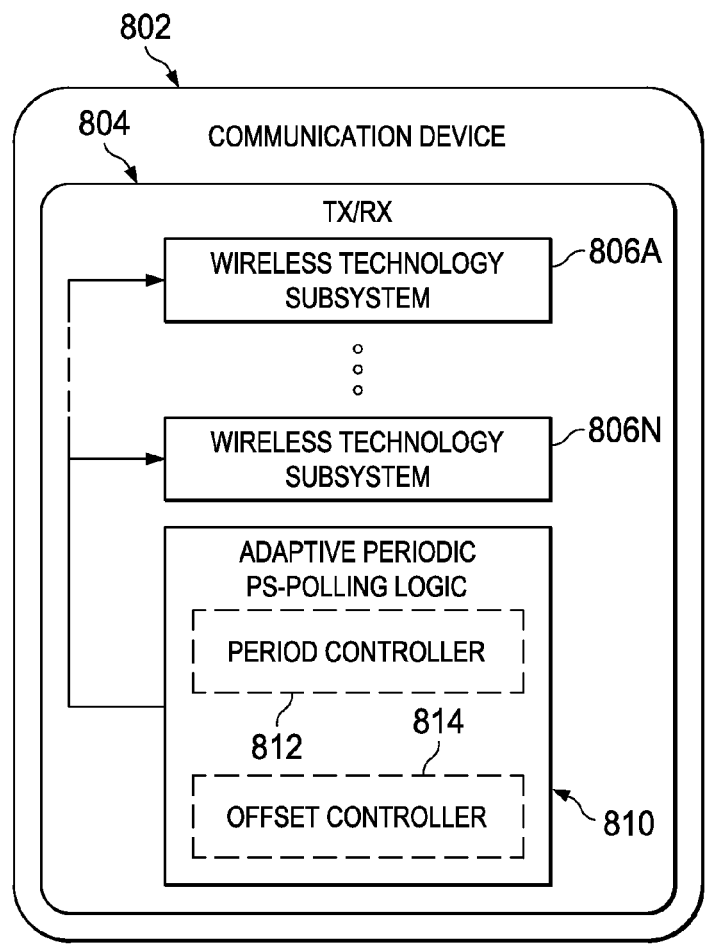
FIG. 8 illustrates a simplified communication device in accordance with an embodiment of the disclosure.

FIG. 8 illustrates a simplified communication device 802 in accordance with an embodiment of the disclosure. The communication device 802 is representative of a station device as described herein. As shown, the communication device 802 comprises a transceiver (TX/RX) 804 having a plurality of wireless technology subsystems 806A-806N. To satisfy QoS flow requirements while conserving power for the communication device 802, the transceiver 804 comprises adaptive periodic PS-Polling logic 810. In general, the APPS-Polling logic 810 determines a period and a start time for periodic PS-Polling. To achieve this, the APPS-Polling logic 810 comprises a period controller 812 and an offset (start time) controller 814. The APPS-Polling logic 810 may be implemented, for example, by a media access control (MAC) layer of the transceiver 804.

In accordance with at least some embodiments, the period controller 812 selectively determines a timer value for periodic PS-Polling by monitoring a periodicity of arrival packets for at least a threshold amount of time. The threshold amount of time should be large enough to prevent random variations in the periodicity of arrival packets. If the timer value is greater than a beacon interval, the transceiver does not implement the timer value for periodic PS-Polling. In accordance with some embodiments, the period controller 812 is configured to perform the method 300.

Sometimes a traffic profile is provided from an access point to the communication device 802. The traffic profile may include, for example, a packet arrival interval and a delay bound. If a packet arrival interval and a delay bound are provided, the period controller 812 may use this provided packet arrival interval as the timer value and foregoes the monitoring process of method 300. Further, the period controller 812 may use a provided delay bound as a timeout timer value for PS-Polling. Alternatively, the period controller 812 may determine the timeout timer value for PS-Polling based on the previously determined periodic PS-Polling interval timer value and a received packet size.

Meanwhile, the offset controller 814 determines a start time for sending periodic PS-Polls based on an access time duration estimated as a time period between when a PS-Poll ACK is received and when buffered data related to the ACK arrives. In at least some embodiments, the offset controller 814 is configured to perform the method 500. The method 300 performed by the period controller 812 and the method 500 performed by the offset controller 814 may be repeated over time such that the periodic PS-Poll interval timer value and the start time for periodic PS-Polling is adjusted over time.

Further, the period controller 812 may perform the method 300 for each of a plurality of QoS flows. Likewise, the offset controller 814 may performed the method 500 for each of a plurality of QoS flows.

Figure 9:
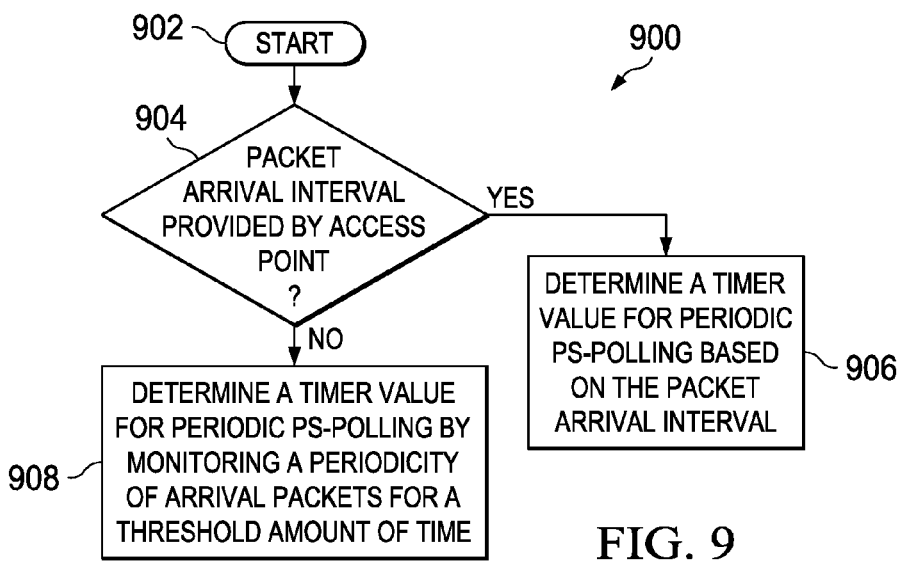
FIG. 9 shows a method for a communication device in accordance with an embodiment of the disclosure.

FIG. 9 shows a method 900 for a communication device (e.g., device 800) in accordance with an embodiment of the disclosure. As shown, the method 900 starts at block 902 and continues to determination block 904, where the method 900 determines if a packet arrival interval is provided by an access point. If the packet arrival interval is provided (determination block 904), a timer value for periodic Power-Save (PS)-Polling is determined based on the packet arrival interval (block 906). If the packet arrival interval is not provided (determination block 904), a timer value for periodic PS-Polling is determined by monitoring a periodicity of arrival packets for at least a threshold amount of time (block 908). The method 900 is performed by a station in communication with an access point and may be repeated over time.

In accordance with at least some embodiments, the method 900 may comprise additional steps that are added individually or in combination. For example, the method 900 may additionally comprise determining if a delay bound is provided by the access point. If so, a timeout timer value for PS-Polling is determined based on the delay bound. If not, a timeout timer value for PS-Polling is determined based on the periodic PS-Polling interval timer value and a received packet size. Further, the method 900 may additionally comprise determining a start time for sending periodic PS-Polls based on an access time duration estimated as a time period between when a PS-Poll ACK is received and when buffered data in response to the last PS-Poll arrives. Further, the method 900 may additionally comprise adjusting the periodic PS-Polling interval timer value over time by repeating the monitoring process and adjusting the start time for periodic PS-Polling over time by repeating the access time duration estimation.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
an access point; and
a station in communication with the access point,
wherein the station selectively implements adaptive periodic Power-Save (APPS)-Polling logic for communications between the station and the access point, wherein the APPS-Polling logic is configured to determine a timer value for periodic PS-Polling by monitoring a periodicity of arrival packets for at least a threshold amount of time and wherein the APPS-Polling logic determines a timeout timer value for PS-Polling based on the timer value and a received packet size.

2. The system of claim 1 wherein the threshold amount of time is large enough to prevent random variations in said periodicity of arrival packets.

3. A system, comprising:
an access point; and
a station in communication with the access point, wherein the station selectively implements adaptive periodic Power-Save (APPS)-Polling logic for communications between the station and the access point, wherein the APPS-Polling logic is configured to determine a timer value for periodic PS-Polling by monitoring a periodicity of arrival packets for at least a threshold amount of time and wherein, if the timer value is greater than a beacon interval, the APPS-Polling logic does not implement the timer value for periodic PS-Polling.

4. A system, comprising:
an access point; and
a station in communication with the access point, wherein the station selectively implements adaptive periodic Power-Save (APPS)-Polling logic for communications between the station and the access point, wherein the APPS-Polling logic is configured to determine a timer value for periodic PS-Polling by monitoring a periodicity of arrival packets for at least a threshold amount of time and wherein, if a traffic profile provided by the access point indicates a packet arrival interval, the APPS-Polling logic uses the provided packet arrival interval as the timer value and foregoes said monitoring.

5. A system, comprising:
an access point; and
a station in communication with the access point, wherein the station selectively implements adaptive periodic Power-Save (APPS)-Polling logic for communications between the station and the access point, wherein the APPS-Polling logic is configured to determine a timer value for periodic PS-Polling by monitoring a periodicity of arrival packets for at least a threshold amount of time and wherein, if a traffic profile provided by the access point indicates a delay bound for the access point, the APPS-Polling logic uses the provided delay bound as a timeout timer value for PS-Polling.

6. A system, comprising:
an access point; and
a station in communication with the access point, wherein the station selectively implements adaptive periodic Power-Save (APPS)-Polling logic for communications between the station and the access point, wherein the APPS-Polling logic is configured to determine a timer value for periodic PS-Polling by monitoring a periodicity of arrival packets for at least a threshold amount of time and wherein the APPS-Polling logic determines a start time for sending periodic PS-Polls based on an access time duration estimated as a time period between when a PS-Poll ACK is received and when buffered data in response to the last PS-Poll arrives.

7. The system of claim 6 wherein the start time is based on the estimated access time duration minus an adjustable time interval.

8. The system of claim 1 wherein the timer value and a start time for the timer value are adjusted over time.

9. A communication device, comprising:
a transceiver with at least one wireless technology subsystem, wherein, to maintain a Quality of Service (QoS) flow while conserving power for the communication device, the transceiver comprises logic that selectively determines a timer value for periodic Power-Save (PS)-Polling by monitoring a periodicity of arrival packets for at least a threshold amount of time and wherein the transceiver determines a timeout timer value for PS-Polling based on the timer value and a received packet size.

10. A communication device, comprising:
a transceiver with at least one wireless technology subsystem, wherein, to maintain a Quality of Service (QoS) flow while conserving power for the communication device, the transceiver comprises logic that selectively determines a timer value for periodic Power-Save (PS)-Polling by monitoring a periodicity of arrival packets for at least a threshold amount of time and wherein the threshold amount of time is large enough to prevent random variations in said periodicity of arrival packets and wherein, if the timer value is greater than a beacon interval, the transceiver does not implement the timer value for periodic PS-Polling.

11. A communication device, comprising:
a transceiver with at least one wireless technology subsystem, wherein, to maintain a Quality of Service (QoS) flow while conserving power for the communication device, the transceiver comprises logic that selectively determines a timer value for periodic Power-Save (PS)-Polling by monitoring a periodicity of arrival packets for at least a threshold amount of time and wherein, if a traffic profile provided by an access point indicates a packet arrival interval and a delay bound, the transceiver uses the provided packet arrival interval as the timer value and foregoes said monitoring, and wherein the transceiver uses the provided delay bound as a timeout timer value for PS-Polling.

12. A communication device, comprising:
a transceiver with at least one wireless technology subsystem, wherein, to maintain a Quality of Service (QoS) flow while conserving power for the communication device, the transceiver comprises logic that selectively determines a timer value for periodic Power-Save (PS)-Polling by monitoring a periodicity of arrival packets for at least a threshold amount of time and wherein the logic determines a start time for sending periodic PS-Polls based on an access time duration estimated as a time period between when a PS-Poll ACK is received and when buffered data in response to the last PS-Poll arrives.

13. A method for a communication device, comprising:
determining if a packet arrival interval is provided by an access point;
if the packet arrival interval is provided, determining a timer value for periodic Power-Save (PS)-Polling based on the packet arrival interval; and
if the packet arrival interval is not provided, determining a timer value for periodic PS-Polling by monitoring a periodicity of arrival packets for at least a threshold amount of time.

14. The method of claim 13 further comprising, determining if a delay bound is provided by the access point;
if the delay bound is provided, determining a timeout timer value for PS-Polling based on the delay bound; and
if the delay bound is not provided, determining a timeout timer value for PS-Polling based on the timer value and a received packet size.

15. The method of claim 13 further comprising determining a start time for sending periodic PS-Polls based on an access time duration estimated as a time period between when a PS-Poll ACK is received and when buffered data in response to the last PS-Poll arrives.

16. The method of claim 15 further comprising adjusting the timer value over time by repeating said monitoring and adjusting the start time over time by repeating said access time duration estimation.

* * * * *